United States Patent
Haugland et al.

(10) Patent No.: US 11,448,088 B2
(45) Date of Patent: Sep. 20, 2022

(54) TEMPERATURE INVERSION DETECTION AND MITIGATION STRATEGIES TO AVOID COMPRESSOR SURGE

(71) Applicant: HONEYWELL INTERNATIONAL INC., Morris Plains, NJ (US)

(72) Inventors: Ronnie Haugland, Scottsdale, AZ (US); Gregory J. Chapman, Scottsdale, AZ (US); Mohamad Hanif Vhora, Chandler, AZ (US); Jeffrey J. Aitchison, Chandler, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 345 days.

(21) Appl. No.: 16/841,882

(22) Filed: Apr. 7, 2020

(65) Prior Publication Data
US 2021/0254496 A1 Aug. 19, 2021

Related U.S. Application Data

(60) Provisional application No. 62/976,605, filed on Feb. 14, 2020.

(51) Int. Cl.
*F01D 21/00* (2006.01)
*F02C 9/16* (2006.01)
(Continued)

(52) U.S. Cl.
CPC ............. *F01D 21/003* (2013.01); *F02C 9/16* (2013.01); *F02C 9/20* (2013.01); *G01K 13/028* (2013.01);
(Continued)

(58) Field of Classification Search
CPC ........ F01D 21/003; F01D 9/041; F01D 17/16; F01D 17/162; F01D 17/165; F02C 9/16;
(Continued)

(56) References Cited

U.S. PATENT DOCUMENTS

| 4,137,710 A | 2/1979 | Preti et al. |
| 4,949,276 A | 8/1990 | Staroselsky et al. |
| (Continued) | | |

FOREIGN PATENT DOCUMENTS

| EP | 2993309 A1 | 3/2016 |
| EP | 3139143 A1 | 3/2017 |
| EP | 3225812 A1 | 10/2017 |
| GB | 2119862 A | 11/1983 |
| GB | 2230822 A | 10/1990 |

OTHER PUBLICATIONS

Hashmi, Muhammad Baquir, et al. "Investigation of the Combined Effect of Variable Inlet Guide Vane Drift, Fouling, and Inlet Air Cooling on Gas Turbine Performance," ENTROPY, Dec. 2019, www.mdpi.com/journal/entropy.

*Primary Examiner* — Loren C Edwards
(74) *Attorney, Agent, or Firm* — Lorenz & Kopf, LLP

(57) ABSTRACT

A system and method for controlling compressor inlet guide vanes of a gas turbine engine in an aircraft includes supplying, to a compressor inlet guide vane control algorithm, an inlet temperature value that is at least representative of sensed engine inlet total temperature. One or more gas turbine engine parameters are sensed with one or more sensors during operation of the gas turbine engine. The one or more gas turbine engine parameters are processed in the engine control unit to determine an inlet temperature modifier value that is an estimate of a difference between the sensed engine inlet total temperature and actual engine inlet total temperature. The inlet temperature modifier value is added to the inlet temperature value to derive a modified engine inlet total temperature. The modified engine inlet total temperature is used in the compressor inlet guide vane control algorithm, which controls the compressor inlet guide vanes.

20 Claims, 9 Drawing Sheets

(51) Int. Cl.
*G01K 13/02* (2021.01)
*F02C 9/20* (2006.01)

(52) U.S. Cl.
CPC .... *F05D 2220/323* (2013.01); *F05D 2260/20* (2013.01); *F05D 2260/82* (2013.01); *F05D 2270/101* (2013.01); *F05D 2270/303* (2013.01); *F05D 2270/3032* (2013.01)

(58) Field of Classification Search
CPC .. F02C 9/20; F05D 2220/323; F05D 2260/20; F05D 2260/82; F05D 2270/101; F05D 2270/303; F05D 2270/3032; G01K 7/42; G01K 13/028
See application file for complete search history.

(56) References Cited

U.S. PATENT DOCUMENTS

| | | |
|---|---|---|
| 7,269,953 B2 | 9/2007 | Gaddle et al. |
| 7,822,512 B2 | 10/2010 | Thatcher et al. |
| 7,874,161 B2 | 1/2011 | Williams |
| 8,474,268 B2 | 7/2013 | Fuller et al. |
| 8,739,551 B2 | 6/2014 | Grewe et al. |
| 9,341,076 B2 | 5/2016 | Rowe et al. |
| 2009/0306927 A1* | 12/2009 | Brivet ................. G01K 13/028 702/141 |
| 2011/0016876 A1 | 1/2011 | Cataldi et al. |
| 2013/0167549 A1 | 7/2013 | Holcomb et al. |
| 2018/0050809 A1* | 2/2018 | Colavincenzo ........ B64D 31/12 |
| 2019/0032557 A1* | 1/2019 | Roach .................... F02C 7/042 |

* cited by examiner

TEMPERATURE INVERSION DETECTION AND MITIGATION STRATEGIES TO AVOID COMPRESSOR SURGE

CROSS-REFERENCE TO RELATIVE APPLICATION

This application claims priority to U.S. Provisional Patent Application No. 62/976,605, filed Feb. 14, 2020.

TECHNICAL FIELD

The present disclosure generally relates to gas turbine engines, and more particularly relates to systems and methods for controlling gas turbine engine compressor inlet guide vanes.

BACKGROUND

Commercial, business, and military aircraft are typically powered by gas turbine engines that have compression systems that employ variable guide vanes. The variable guide vanes on the compressor of a gas turbine engine are typically controlled as a function of various engine-related parameters, such as engine inlet temperature, pressure altitude, and compressor(s) rotational speeds. In many instances, engine inlet temperature is sensed using resistance temperature detectors (RTDs) or thermocouples, which are designed for high reliability and robustness, but can exhibit relatively long sensor lag. In addition, various software features (e.g., filters and rate limiters) that are used to address electromagnetic interference (EMI), high-intensity radio frequency (HIRF), and lightning, can also increase overall response time. While the sensor lag and software delays are sufficient under normal operating conditions, this may result in insufficient response during temperature inversion events. Thus, when taking off into a severe temperature inversion, or experiencing various other phenomenon that may result in an unexpected increase in engine inlet total temperature, the variable guide vanes may be miss-scheduled. In some instances, this can cause the engine to surge.

An engine surge is undesirable because it can result in a thrust reduction. If the thrust reduction is sufficient in magnitude and duration it can negatively affect the aircraft climb rate. Consequently, engine surges are to be avoided particularly in the takeoff phase of flight. Severe temperature inversions, or various other phenomenon that may result in an unexpected increase in engine inlet total temperature, occur with sufficient frequency that a method to detect and accommodate their presence is needed.

The present invention addresses the need to detect the presence and magnitude of unexpected increases in engine inlet total temperature, due to temperature inversions or various other phenomenon, and re-schedules the compressor guide vanes to avoid an engine surge.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method for controlling compressor inlet guide vanes of a gas turbine engine in an aircraft includes supplying, to a compressor inlet guide vane control algorithm that is implemented in an engine control unit that is coupled to the gas turbine engine, an inlet temperature value that is at least representative of sensed engine inlet total temperature. One or more gas turbine engine parameters are sensed with one or more sensors during operation of the gas turbine engine. The one or more gas turbine engine parameters are processed by the engine control unit to determine an inlet temperature modifier value that is an estimate of a difference between the sensed engine inlet total temperature and actual engine inlet total temperature. The inlet temperature modifier value is added to the inlet temperature value to derive a modified engine inlet total temperature. The modified engine inlet total temperature is used in the compressor inlet guide vane control algorithm, which controls the compressor inlet guide vanes.

In another embodiment, a system for controlling compressor inlet guide vanes of a gas turbine engine in an aircraft includes an engine data source and an engine control unit. The engine data source is configured to supply data representative of one or more sensed gas turbine engine parameters. The engine control unit is configured to implement a compressor inlet guide vane control algorithm, and is coupled to receive the engine data from the engine data source and an inlet temperature value that is at least representative of sensed engine inlet total temperature. The engine control unit is further configured to: (i) supply the inlet temperature value to the compressor inlet guide vane control algorithm, (ii) process the one or more gas turbine engine parameters to determine an inlet temperature modifier value, the inlet temperature modifier value being an estimate of a difference between the sensed engine inlet total temperature and actual engine inlet total temperature, (iii) add the inlet temperature modifier value to the inlet temperature value to derive a modified engine inlet total temperature, (iv) use the modified engine inlet total temperature in the compressor inlet guide vane control algorithm, and (v) control the compressor inlet guide vanes using the compressor inlet guide vane control algorithm.

In yet another embodiment, a system includes a gas turbine engine, an engine data source, and an engine control unit. The gas turbine engine includes a compressor section and a plurality of compressor inlet guide vanes. The plurality of compressor inlet guide vanes respond to guide vane commands to move to commanded guide vane positions. The engine data source is in operable communication with the gas turbine engine and is configured to supply data representative of one or more sensed gas turbine engine parameters. The engine control unit is in operable communication with the gas turbine engine and the engine data source and is configured to implement a compressor inlet guide vane control algorithm. The engine control unit is coupled to receive the engine data from the engine data source and an inlet temperature value that is at least representative of sensed engine inlet total temperature. The engine control unit is further configured to: (i) supply the inlet temperature value to the compressor inlet guide vane control algorithm, (ii) process the one or more gas turbine engine parameters to determine an inlet temperature modifier value, the inlet temperature modifier value being an estimate of a difference between the sensed engine inlet total temperature and actual engine inlet total temperature, (iii) add the inlet temperature modifier value to the inlet temperature value to derive a modified engine inlet total temperature, (iv) use the modified engine inlet total temperature in the compressor inlet guide vane control algorithm, and (v) control the compressor inlet guide vanes using the compressor inlet guide vane control algorithm.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
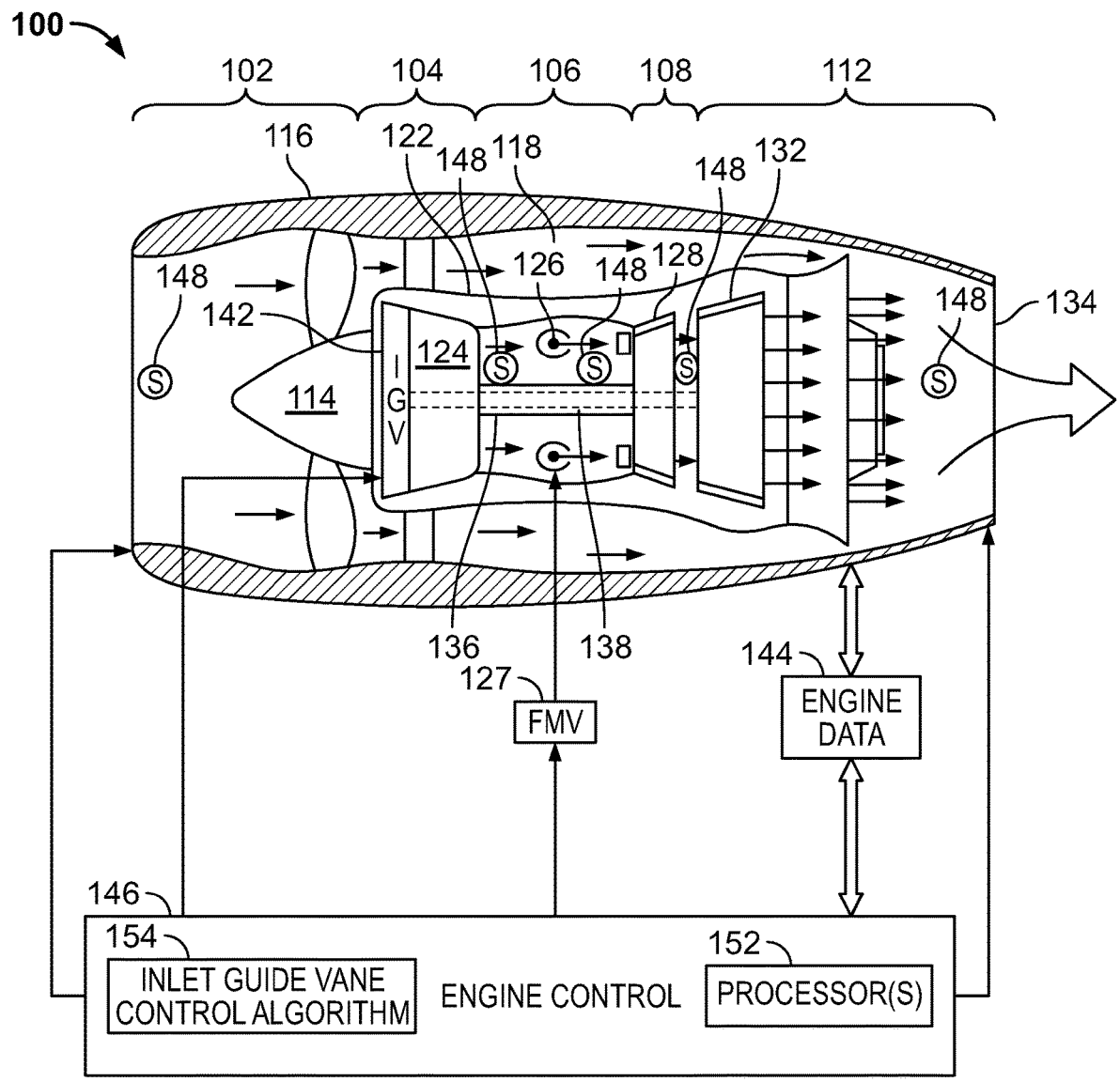
FIG. 1 depicts a functional block diagram of an exemplary gas turbine engine control system.

Turning now to FIG. 1, a functional block diagram of an exemplary gas turbine engine control system is depicted. The depicted system is for a dual-spool turbofan gas turbine engine 100. Before proceeding further, however, it will be appreciated that the system and process described herein could be implemented in various other gas turbine engine configurations such as, for example, triple-spool engines, single spool engines, non-turbofan engines, and auxiliary power units, just to name a few.

The depicted gas turbine engine includes an intake section 102, a compressor section 104, a combustion section 106, a turbine section 108, and an exhaust section 112. The intake section 102 includes a fan 114, which is mounted in a fan case 116. The fan 114 draws air into the intake section 102 and accelerates it. A fraction of the accelerated air exhausted from the fan 114 is directed through a bypass section 118 disposed between the fan case 116 and an engine cowl 122, and provides a forward thrust. The remaining fraction of air exhausted from the fan 114 is directed into the compressor section 104.

The compressor section 104 may include one or more compressors 124, which raise the pressure of the air directed into it from the fan 114, and directs the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel that is controllably supplied to the combustor assembly 126 from a non-illustrated fuel source via a fuel metering valve 127. The fuel and air mixture is combusted, and the high energy combusted air mixture is then directed into the turbine section 108.

The turbine section 108 includes one or more turbines. In the depicted embodiment, the turbine section 108 includes two turbines, a high-pressure turbine 128, and a low-pressure turbine 132. However, it will be appreciated that the engine 100 could be configured with more or less than this number of turbines. No matter the particular number, the combusted air mixture from the combustion section 106 expands through each turbine 128, 132, causing it to rotate. The combusted air mixture is then exhausted through a exhaust nozzle 134 disposed in the exhaust section 112, providing additional forward thrust. As the turbines 128 and 132 rotate, each drives equipment in the engine 100 via concentrically disposed shafts or spools. Specifically, the high-pressure turbine 128 drives the compressor 124 via a high pressure spool 136, and the low pressure turbine 132 drives the fan 114 via a low pressure spool 138.

The depicted engine 100 additionally includes a plurality of variable geometry devices. The variable geometry devices, which may be variously configured and implemented, impact the effective geometry of the engine 100 and, for a given fuel flow, can be positioned to either increase or decrease engine speed. Some non-limiting examples of the variable geometry devices include one or more of a plurality of variable inlet guide vanes 142. Though not depicted or further described herein, it will be appreciated that the depicted engine may additionally include other various geometry devices such as, for example, and one or more of bleed air flow control valves, a variable area engine inlet, one or more sets of variable turbine stator vanes, and a variable area exhaust nozzle, just to name a few.

The variable inlet guide vanes 142 are responsive to guide vane position commands to move to commanded guide vane positions. As is generally known, for given engine conditions, closing the variable inlet guide vanes 142 will cause the rotational speed of the engine 100 to increase, and opening the variable inlet guide vanes 142 will cause the rotational speed of the engine 100 to decrease.

As FIG. 1 further depicts, the system additionally includes an engine data source 144 and an engine control 146. The engine data source 144 is coupled to the gas turbine engine 100 and is configured to supply engine data representative of gas turbine engine operability. The engine data source 144 may be variously configured and implemented, but in the depicted embodiment the engine data source 144 is implemented using various sensors that are configured to supply data representative of various parameters associated with gas turbine engine operability and performance. The parameters may also vary, but include at least engine inlet total temperature (Tt2), compressor discharge pressure (P3), fuel flow rate (Wf), and turbine temperature, which may include one or more of turbine inlet temperature, turbine temperature, or exhaust gas temperature, just to name a few. The parameters may also include various other parameters such as shaft torque, engine rotational speeds (both N1 and N2), and various other engine temperatures and pressures, just to name a few. Thus, as FIG. 1 also depicts, various sensors 148 are provided to sense the various parameters.

No matter how the engine data source 144 is specifically implemented, the engine control 146 is coupled to receive the engine data supplied from the engine data source 144. The engine control 146, which includes one or more processors 152, is configured, upon receipt of the engine data, to control the operation of the gas turbine engine 100. The engine control 146 is additionally configured, upon receipt of the engine data, to control the position of the compressor inlet guide vanes 142 by implementing an inlet guide vane control algorithm 154 that will avoid a compressor surge that may occur due to, for example, a temperature inversion.

The inlet guide vane control algorithm 154 is based on one of two known control algorithms. Both of these known algorithms use an inlet temperature value that is at least representative of the sensed engine inlet total temperature (Tt2). In one of the known algorithms, the inlet temperature value is the sensed engine inlet total temperature (Tt2) throughout operation of the aircraft. In the other known algorithm, the inlet temperature value is the sensed engine inlet total temperature (Tt2) that is selectively "locked out" and then calculated based on sensed airspeed and sensed altitude until a predetermined altitude is attained. More specifically, with this latter algorithm, when the aircraft attains a predetermined speed during a takeoff roll (e.g., 60 knots), the sensed engine inlet total temperature at that point in time is stored, and engine inlet total temperature is then calculated using the stored engine inlet total temperature by adjusting it, using a known algorithm, for changes in sensed airspeed and sensed altitude, assuming standard atmospheric lapse. When the aircraft attains the predetermined altitude (e.g., 400 feet above ground level (AGL), the lockout is removed and sensed engine inlet total temperature (Tt2) is once again used.

Regardless of which of the known algorithms is implemented, the known algorithm is modified in a manner that was heretofore unknown to implement the inlet guide vane control algorithm 154 described herein. With this inlet guide vane control algorithm 154, the engine control 146 determines an inlet temperature modifier value and uses this value to modify an inlet temperature value that is at least representative of either the sensed or the "locked out" engine inlet total temperature (Tt2) to properly control the compressor inlet guide vanes 142 to thereby avoid a compressor surge. More specifically, the inlet guide vane control algorithm 154 uses the engine performance parameters to estimate the difference between the sensed engine inlet total temperature (Tt2) and the actual engine inlet total temperature and adds this value to the inlet temperature value to derive the modified engine inlet total temperature (Tt2).

Figure 2:
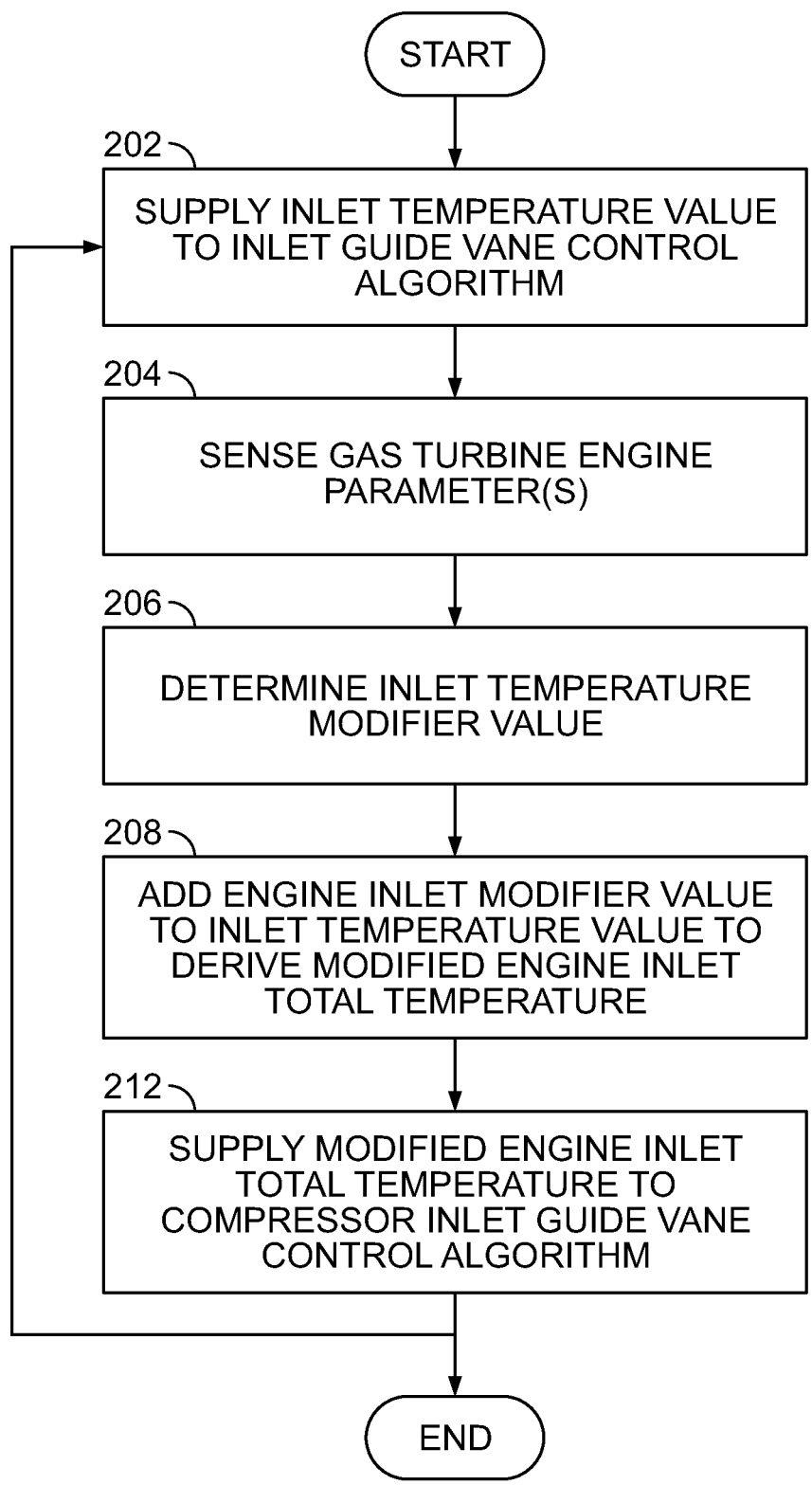
FIG. 2 depicts, in flowchart form, one embodiment of a method, implemented by the system of FIG. 1, of controlling compressor inlet guide vanes of a gas turbine engine.

More specifically, and as illustrated in flowchart form in FIG. 2, the inlet temperature value is supplied to the compressor inlet guide vane control algorithm 154 (202). As noted above, this inlet temperature value is at least representative of the sensed engine inlet total temperature (Tt2). The one or more sensors 148 sense the one or more gas turbine engine parameters during operation of the gas turbine engine 100 (204), and the engine control 146 processes the one or more gas turbine engine parameters to determine the inlet temperature modifier value (206). The engine control 146 adds the inlet temperature modifier value to the inlet temperature value to derive the modified engine inlet total temperature (208). The modified engine inlet total temperature is supplied to, and used in, the compressor inlet guide vane control algorithm 154 to control he compressor inlet guide vanes 142 (212).

As may be appreciated, various phenomena may cause an unexpected increase in engine inlet temperature, and thereby result in actual engine inlet total temperature being greater than the inlet temperature value. Some non-limiting examples of such causes include a temperature inversion, exhaust gas ingestion from an engine on another aircraft or an engine on the same aircraft, or ingestion from an armament. It may also be appreciated that the manner in which the engine control 146 determines the engine inlet modifier value. In one particular embodiment, the control 146 makes this determination by comparing various sensed engine performance parameters to the expected values for these parameters and determining that actual engine inlet temperature is different from the inlet temperature value when one or more of the sensed performance parameters differ from the expected performance parameters. Although the engine performance parameters used to make this determination may vary, in one particular embodiment, compressor discharge pressure (P3), fuel flow (Wf), and turbine temperature are used. Thus, the engine control 146 compares the sensed compressor discharge pressure, sensed fuel flow, and sensed turbine temperature to the expected values of compressor discharge pressure, fuel flow, and turbine temperature, respectively. When one or more of these parameters differs from its expected value it is indicative that actual engine inlet temperature is different from the inlet temperature value due, for example, to a temperature inversion occurring. Of course, various other engine performance parameters, such as shaft torque, may also be used.

Figure 3:
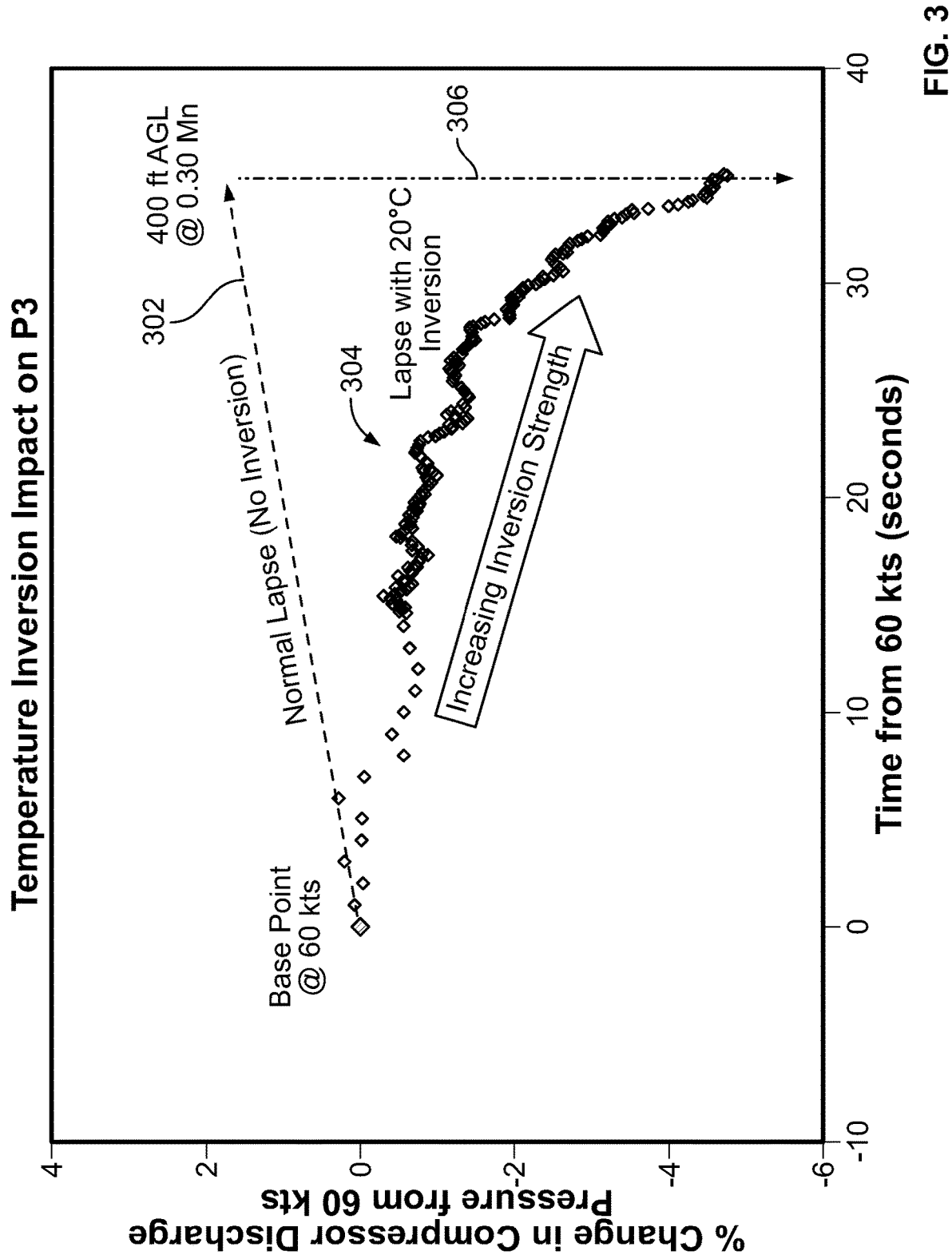
FIGS. 3-5 depict graphs of how various engine performance parameters may vary both when an unexpected increase in engine inlet temperature is not occurring and when it is occurring.
Figure 4:
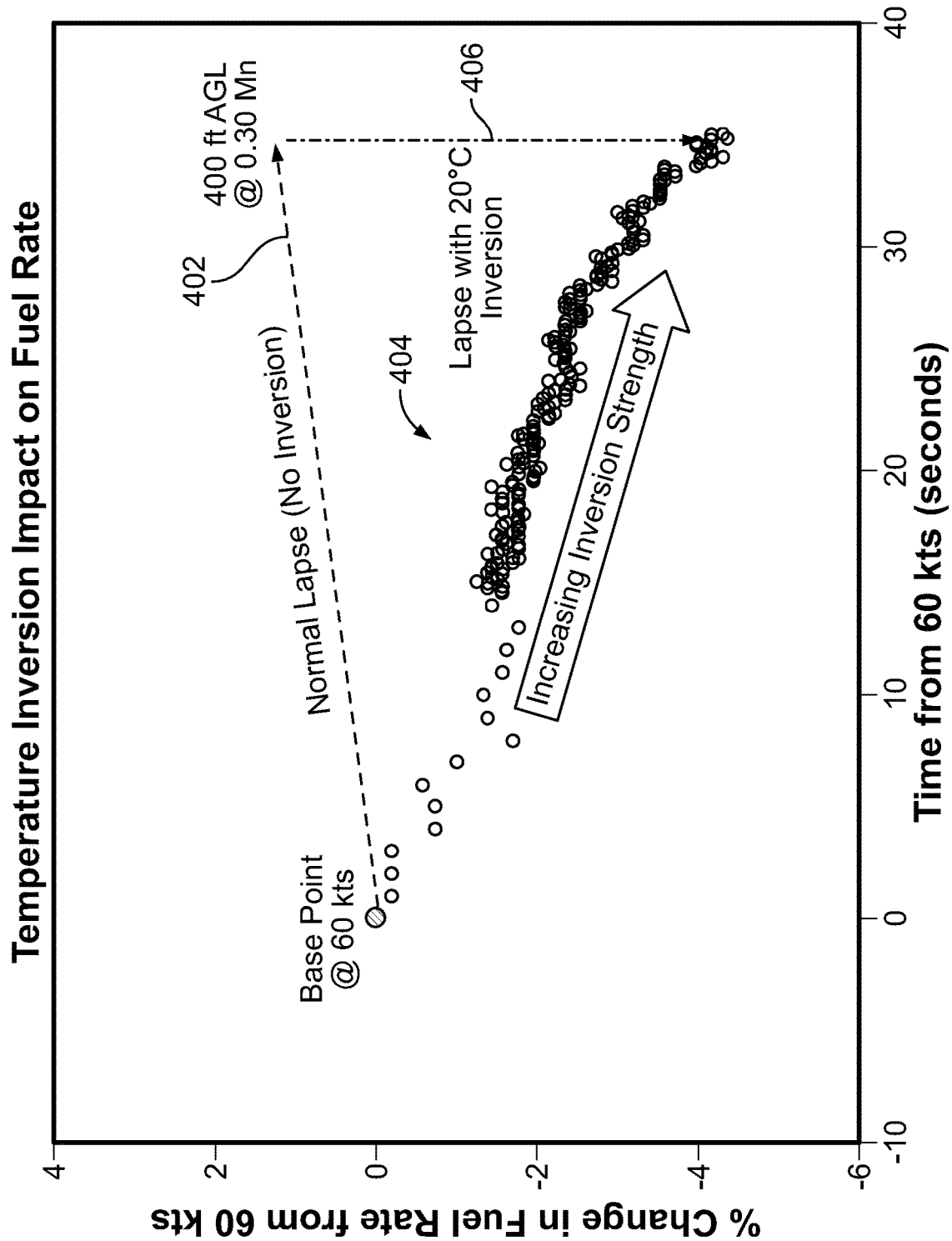
Figure 5:
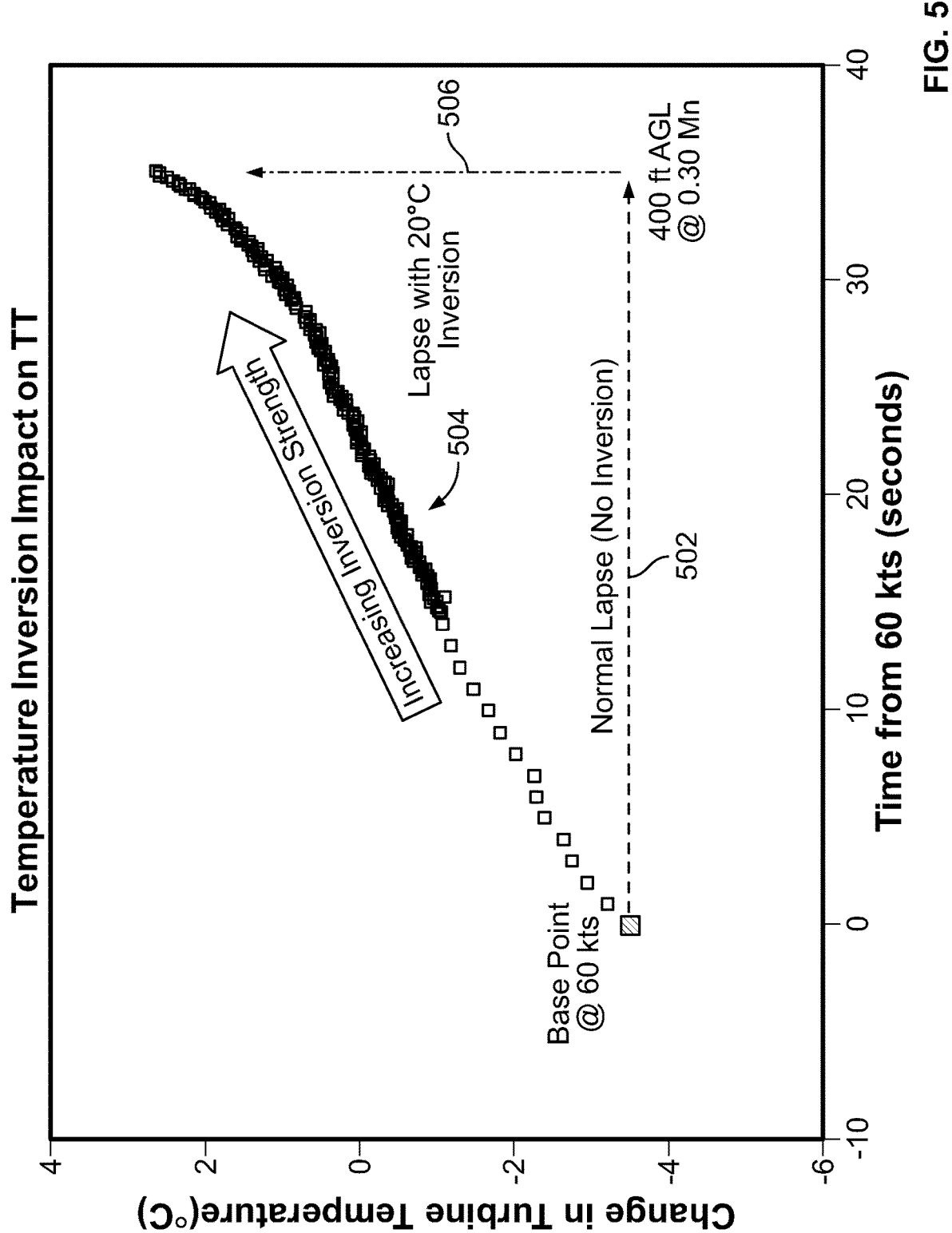

To provide an illustrative example, reference should now be made to FIGS. 3-5, which depict how compressor discharge pressure (P3) (FIG. 3), fuel flow (WF) (FIG. 4), and turbine temperature (FIG. 5) vary both when an unexpected increase in engine inlet temperature is not occurring and when it is occurring. In the depicted example, the unexpected increase in engine inlet total temperature is caused by a temperature inversion. It is seen that during a standard altitude lapse, P3 and WF are expected to increase in value, and turbine temperature is expected to remain flat as flight speed is increased from the predetermined speed (e.g., 60 knots) at ground level to a second speed (e.g., 0.30 Mn) at 400 feet AGL. This behavior is represented by curves 302, 402, and 502, in FIGS. 3, 4, and 5, respectively. If, however, a temperature inversion is present, P3, WF, and turbine temperature will differ significantly from their expected values, as illustrated by the data points 304, 404, 504, in FIGS. 3, 4, and 5, respectively. The magnitude of the difference between the sensed and expected values is used to determine the inlet temperature modifier value. In particular, the deviation between the sensed and expected values of P3, WF, and turbine temperature (illustrated at the maximum deviations by vertical lines 306, 406, and 506) are calculated in real-time, with derivatives applied to determine the inlet temperature modifier value, which, in the illustrated example, is due to a temperature inversion.

Figure 6:
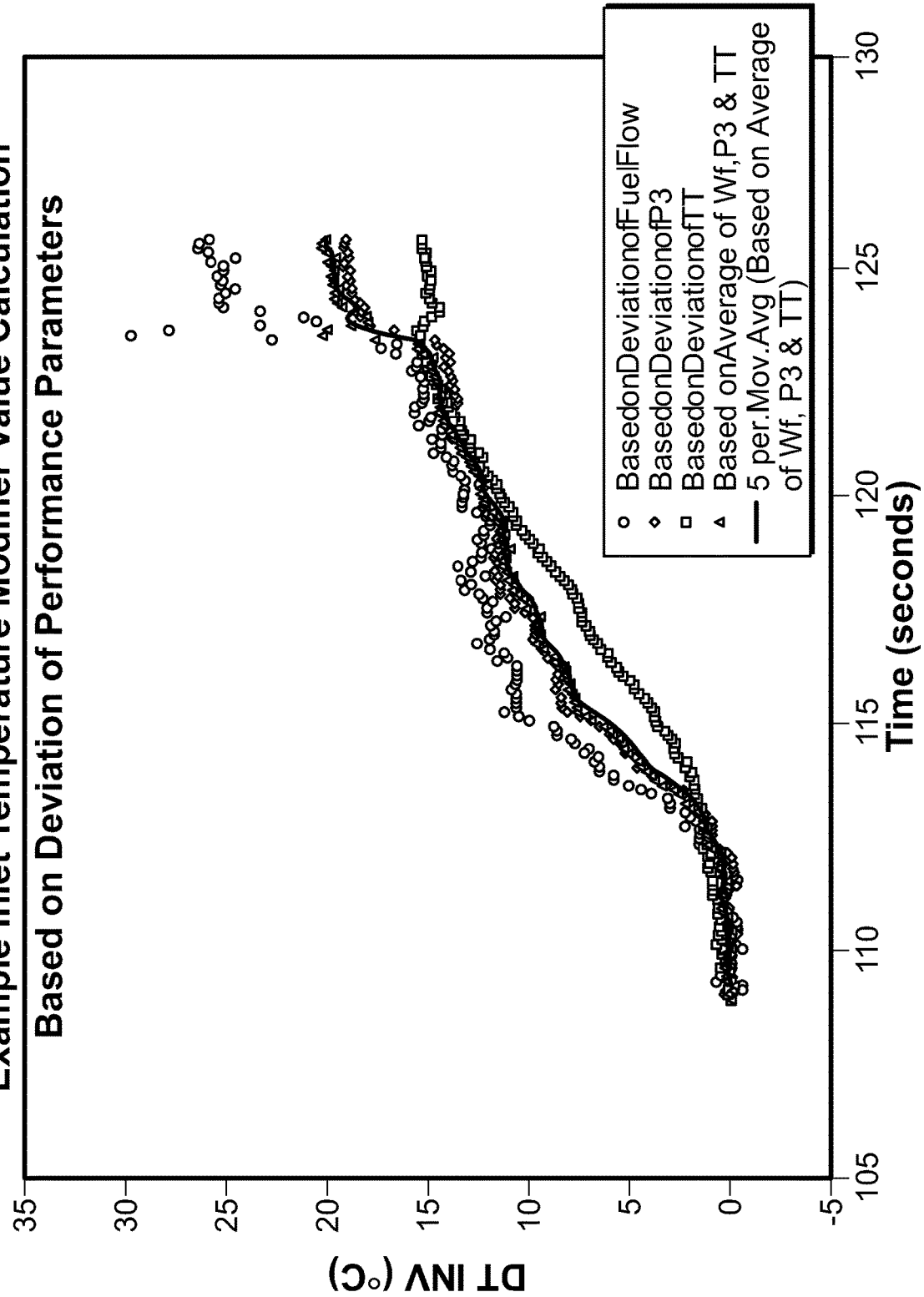
FIG. 6 graphically depicts an example of a determination of inlet temperature modifier value versus time based on the various engine performance parameters depicted in FIGS. 3-5.
Figure 7:
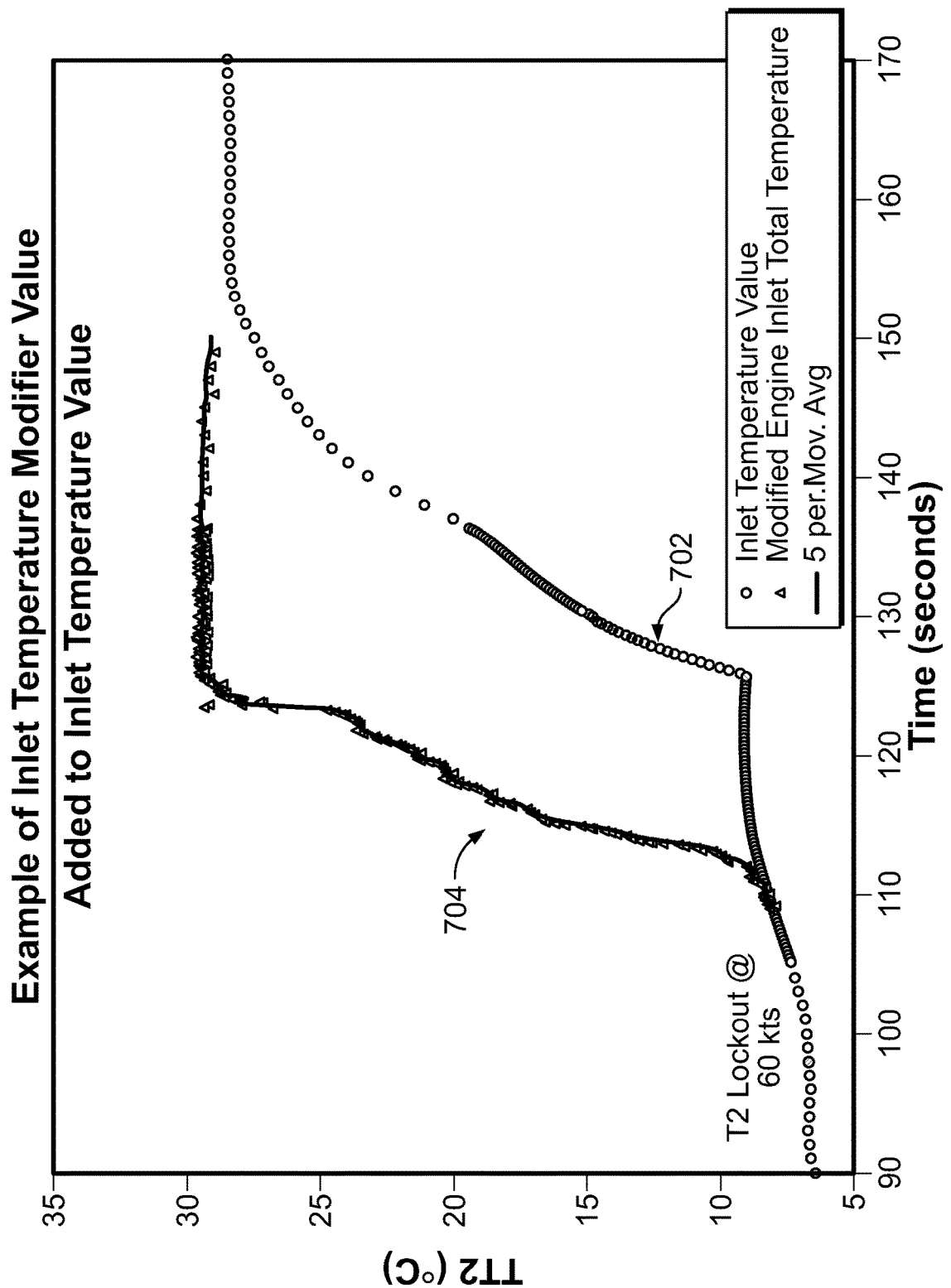
FIG. 7 graphically depicts an example of the temperature modifier value being added to the inlet temperature value to derive the modified engine inlet total temperature.

The just-described functionality is illustrated more clearly in FIGS. 6 and 7. In particular, FIG. 6 depicts an example of a determination of the inlet temperature modifier value versus time, based on P3, WF, and turbine temperature, as well as an average thereof. As noted above, the inlet temperature modifier value is added to the inlet temperature value to derive the modified engine inlet total temperature, which is in turn used to properly schedule the compressor inlet guide vanes 142 to thereby avoid a surge. An example of the temperature modifier value being added to the inlet temperature value 702 to derive the modified engine inlet total temperature 704 is depicted in FIG. 7. As may be appreciated, the inlet temperature modifier value could be as low as 0° C.

In some embodiments, the inlet temperature modifier value may be limited to positive values only, thereby only allowing for an increase in inlet temperature value. The inlet temperature modifier value may also, in some embodiments, have a maximum upper limit to its authority. For example, the inlet temperature modifier value may have a maximum upper limit of 20-25° C., based on observations of maximum temperature inversion strengths. The maximum upper limit may vary, however, as needed.

It will additionally be appreciated that the inlet temperature modifier value may be determined from various combinations of deviations between the sensed and expected values of P3, WF and turbine temperature. For example, it may be determined from just P3, or from P3 and WF, or from P3 and turbine temperature, or from P3 and WF and turbine temperature, etc. To provide some protection against noise and to provide smoothness the inlet temperature modifier value may, at least in some embodiments, be based on a rolling average that is calculated in the engine control unit 146. The engine control unit 146 may also be configured to selectively invoke conflict logic that will set the inlet temperature modifier value to zero (0) if two or more of the gas turbine engine parameters vary oppositely. That is, the parameters move in contrary ways. For example, if P3 increases while WF decreases (or vice-versa), the engine control unit 146 may invoke the conflict logic.

In still other embodiments, the engine control unit 146 may implement permissive criteria before determining or using the inlet temperature modifier value. For example, determining or using the inlet temperature modifier value may not be permitted until aircraft lift-off is detected (weight off wheels signal from the aircraft), and/or it may not be permitted when one or more of AGL has exceeded a predetermined altitude, power lever angle (PLA) is reduced, and aircraft bleed levels are switched on. Moreover, in some embodiments, engine control unit 146 may be configured to reduce the determined inlet temperature modifier value if the rotational speed of the compressor approaches its limiting value due to closing of the IGVs 142, which increases rotational speed.

Some aircraft may include engines with a compressor that implements variable geometry and that, unlike a turbofan engine, does not use fixed power-sets and is subject to more transient behavior. For these engines, the engine control unit 146 may be configured to add the inlet temperature modifier value to the inlet temperature value only after one or more of the sensed engine performance parameters differs from its expected value by a predetermined magnitude. It will be appreciated that the predetermined magnitude associated with each of the engine performance parameters may vary. In one non-limiting example, the engine control 146 adds the inlet temperature modifier value to the inlet temperature value only after one or more of the sensed compressor discharge pressure, sensed fuel flow, sensed turbine temperature, and sensed torque differ from the expected compressor discharge pressure, fuel flow, turbine temperature, and shaft torque by 2.0%, 1.5%, 10° C., and 2%, respectively. These magnitudes are merely examples of one particular embodiment and may vary from engine to engine, aircraft to aircraft, etc.

It should be noted that the responsiveness of the engine control 146, at least for implementing compressor inlet guide vane control, may be impacted by several factors. One factor is the responsiveness of the sensor used to measure engine inlet total temperature (Tt2). As previously noted, either a resistance temperature detector (RTD) or a thermocouple is typically used, which can exhibit relatively long time-constants (e.g., approximately 4 seconds or more). Additionally, various software features (e.g., filters and rate limiters) that are used to address electromagnetic interference (EMI), high-intensity radio frequency (HIRF), and lightning, can further increase the response time. The above-described system and method overcomes these potential response time issues that may mask an unexpected increase in engine inlet total temperature during the takeoff phase of flight. Another methodology that may be employed instead of, or in addition to, the previously described methodology, is depicted in FIG. 8, and with reference thereto will now be described.

Figure 8:
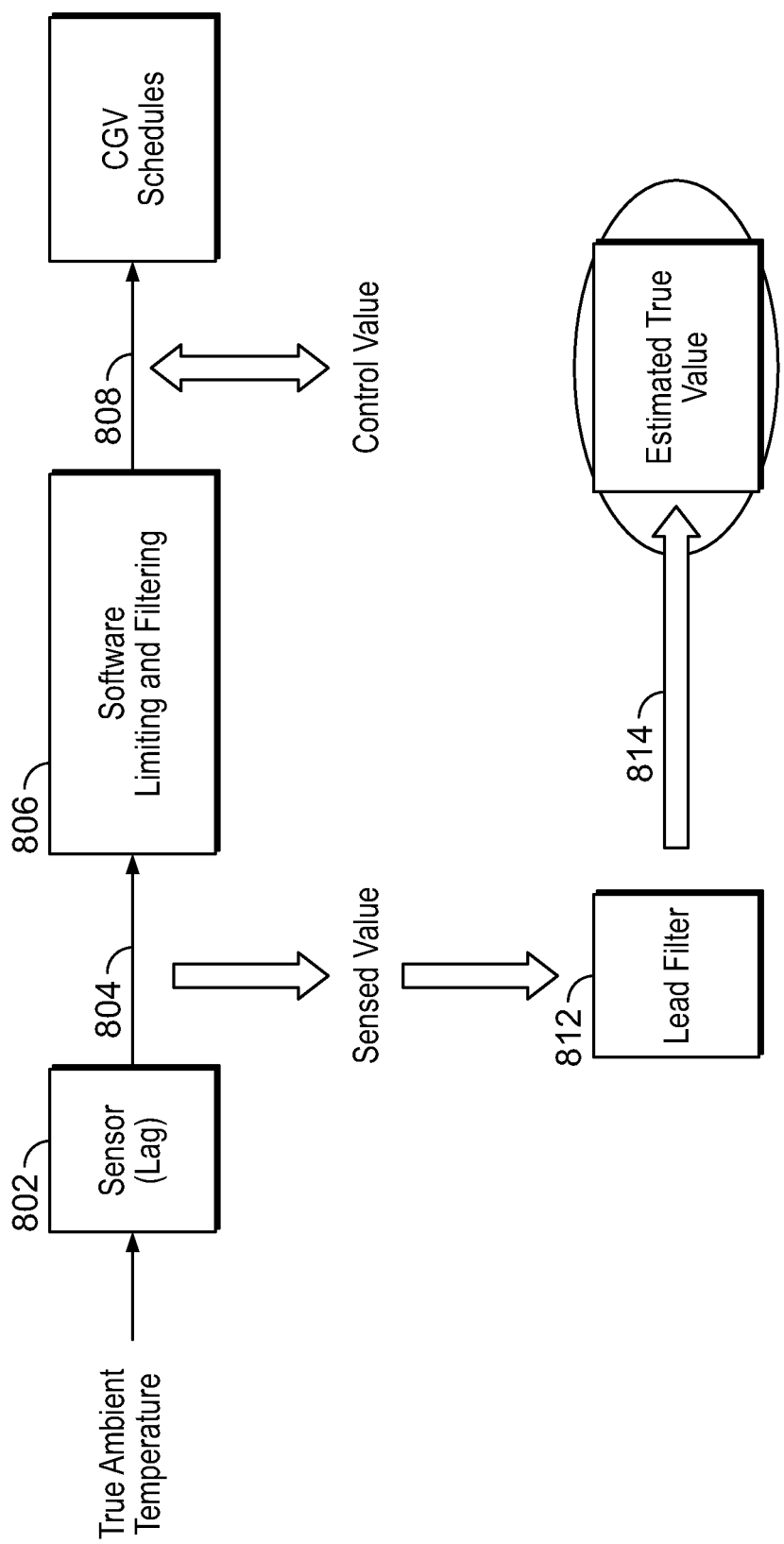
FIG. 8 depicts a functional block diagram of another methodology that may be used to determine an engine inlet temperature modifier.
Figure 9:
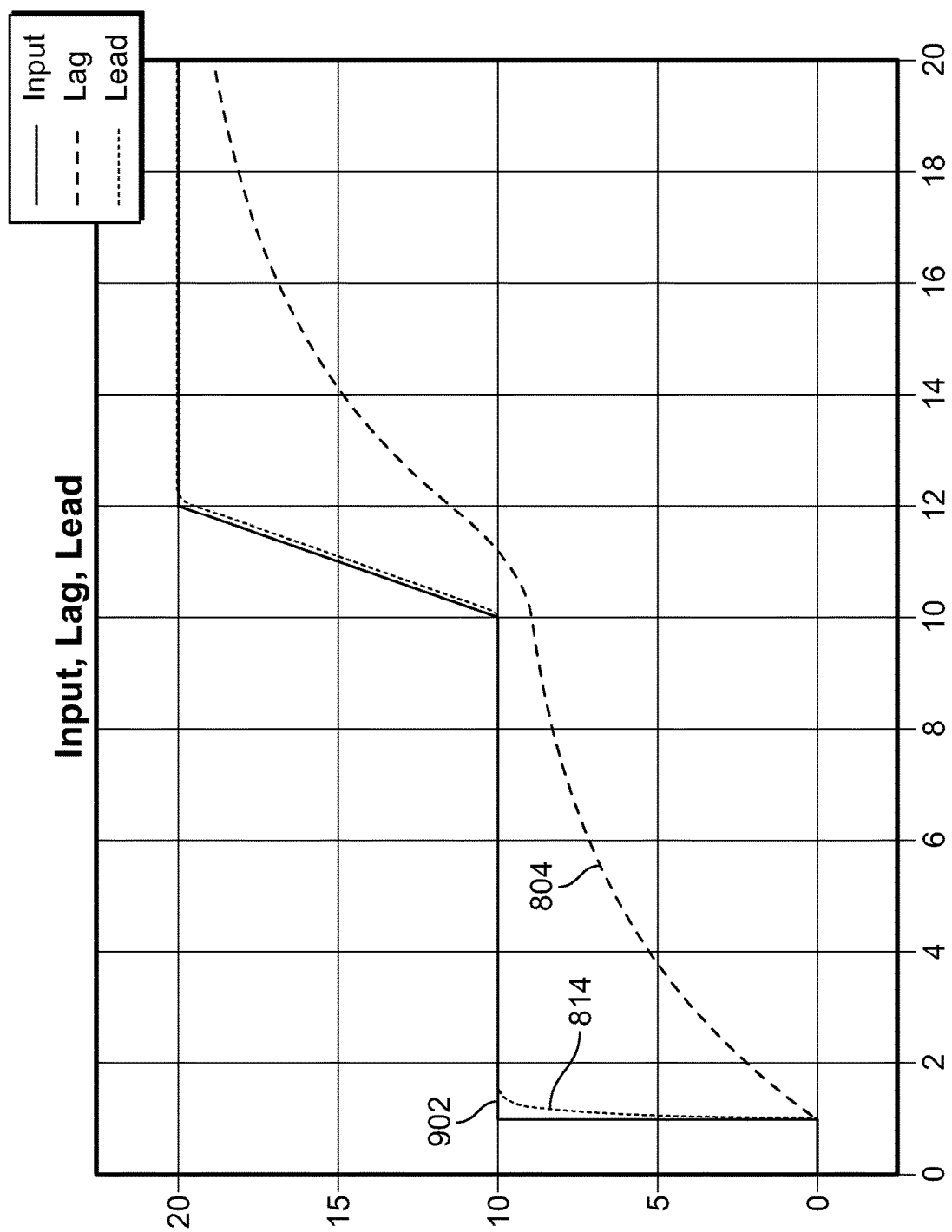
FIG. 9 graphically depicts the potential deviation that can occur between actual engine inlet temperature, sensed engine inlet total temperature, and estimated true temperature using the methodology depicted in FIG. 8.

As depicted in FIG. 8, the engine inlet total temperature (Tt2) is a sensed engine inlet total temperature 804 supplied from an engine inlet total temperature sensor 802. As just noted, and as FIG. 8 depicts, such sensors 802 exhibit some response lag. The sensed engine inlet total temperature 804 is processed through a limiting and filtering algorithm 806 to supply a filtered and limited total temperature 808. The sensed engine inlet total temperature 804 is also filtered through a lead filter 812 to supply an estimated true temperature 814. The filtered and limited total temperature 808 is then compared to the estimated true temperature 814 to determine the inlet temperature modifier value. One example of the potential deviation that can occur between actual engine inlet temperature 902, sensed engine inlet total temperature 804, and estimated true temperature 814 is depicted in FIG. 9.

As with the previously described embodiments, the engine control unit 146 may not add the inlet temperature modifier value to the inlet temperature value until the estimated true temperature 814 exceeds the filtered and limited total temperature 808 by a predetermined magnitude. In one non-limiting example, the predetermined threshold may be 5° C., just to name one potential threshold value.

The systems and methods described herein detect the presence and magnitude of unexpected increases in engine inlet total temperature, due to temperature inversions or various other phenomenon, and re-schedules the compressor guide vanes to avoid an engine surge.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of controlling a plurality of compressor inlet guide vanes of a gas turbine engine in an aircraft, the method comprising the steps of:
    supplying, to a compressor inlet guide vane control algorithm that is implemented in an engine control unit that is coupled to the gas turbine engine, an inlet temperature value that is at least representative of a sensed engine inlet total temperature;
    sensing, with one or more sensors, one or more gas turbine engine parameters during operation of the gas turbine engine;
    processing the one or more gas turbine engine parameters, in the engine control unit, to determine an inlet temperature modifier value, the inlet temperature modifier value being an estimate of a difference between the sensed engine inlet total temperature and an actual engine inlet total temperature;
    adding, in the engine control unit, the inlet temperature modifier value to the inlet temperature value to derive a modified engine inlet total temperature;
    using the modified engine inlet total temperature in the compressor inlet guide vane control algorithm; and
    controlling the compressor inlet guide vanes using the compressor inlet guide vane control algorithm.

2. The method of claim 1, wherein the one or more gas turbine engine parameters include at least one or more of a sensed compressor discharge pressure, a sensed fuel flow, a sensed turbine temperature, and a sensed shaft torque.

3. The method of claim 2, further comprising:
    comparing one or more of the sensed compressor discharge pressure, the sensed fuel flow, the sensed turbine temperature, and the sensed shaft torque to an expected value of compressor discharge pressure, an expected value of fuel flow, an expected value of turbine temperature, and an expected value of shaft torque respectively; and
    determining or using the inlet temperature modifier value only when one or more of:
    (i) the sensed compressor discharge pressure differs from the expected value of compressor discharge pressure by a first predetermined magnitude,
    (ii) the sensed fuel flow differs from the expected value of fuel flow by a second predetermined magnitude,
    (iii) the sensed turbine temperature differs from the expected value of turbine temperature by a third predetermined magnitude, and
    (iv) the sensed shaft torque differs from the expected value of shaft torque by a fourth predetermined magnitude.

4. The method of claim 1, further comprising:
    determining if two or more of the gas turbine engine parameters oppositely vary; and
    invoking conflict logic that sets the inlet temperature modifier value to zero when the two or more of the gas turbine engine parameters oppositely vary.

5. The method of claim 1, wherein the one or more gas turbine engine parameters include an engine inlet total temperature.

6. The method of claim 5, wherein the engine inlet total temperature is the sensed engine inlet total temperature supplied from an engine inlet total temperature sensor, and wherein the method further comprises:
    processing the sensed engine inlet total temperature through a limiting and filtering algorithm to supply a filtered and limited total temperature;
    filtering the sensed engine inlet total temperature through a lead filter to supply an estimated true temperature; and
    comparing the filtered and limited total temperature to the estimated true temperature to determine the inlet temperature modifier value.

7. The method of claim 6, further comprising:
    determining or using the inlet temperature modifier value only when the estimated true temperature exceeds the filtered and limited total temperature by a predetermined magnitude.

8. A system for controlling a plurality of compressor inlet guide vanes of a gas turbine engine in an aircraft, the system comprising:
    an engine data source configured to supply an engine data representative of one or more sensed gas turbine engine parameters; and
    an engine control unit configured to implement a compressor inlet guide vane control algorithm, the engine control unit coupled to receive the engine data from the engine data source and an inlet temperature value that is at least representative of a sensed engine inlet total temperature, the engine control unit configured to:
    (i) supply the inlet temperature value to the compressor inlet guide vane control algorithm,
    (ii) process the one or more sensed gas turbine engine parameters to determine an inlet temperature modifier value, the inlet temperature modifier value being an estimate of a difference between the sensed engine inlet total temperature and an actual engine inlet total temperature,
    (iii) add the inlet temperature modifier value to the inlet temperature value to derive a modified engine inlet total temperature,
    (iv) use the modified engine inlet total temperature in the compressor inlet guide vane control algorithm, and
    (v) control the compressor inlet guide vanes using the compressor inlet guide vane control algorithm.

9. The system of claim 8, wherein:
    the engine data source comprises a plurality of sensors; and
    each sensor is operable to sense a respective parameter of the one or more sensed gas turbine engine parameters during operation of the gas turbine engine.

10. The system of claim 9, wherein the plurality of sensors includes one or more of:
    a compressor discharge pressure sensor;
    a fuel flow sensor;
    a turbine temperature sensor; and
    a shaft torque sensor.

11. The system of claim 9, wherein the engine control unit is further configured to:
compare one or more of a sensed compressor discharge pressure, a sensed fuel flow, a sensed turbine temperature, and a sensed shaft torque to an expected value of compressor discharge pressure, an expected value of fuel flow, an expected value of turbine temperature, and an expected value of shaft torque respectively; and
determine or use the inlet temperature modifier value only when one or more of:
  (i) the sensed compressor discharge pressure differs from the expected value of compressor discharge pressure by a first predetermined magnitude,
  (ii) the sensed fuel flow differs from the expected value of fuel flow by a second predetermined magnitude,
  (iii) the sensed turbine temperature differs from the expected value of turbine temperature by a third predetermined magnitude, and
  (iv) the sensed shaft torque differs from the expected value of shaft torque by a fourth predetermined magnitude.

12. The system of claim 8, wherein the engine control unit is further configured to:
determine if two or more of the sensed gas turbine engine parameters are oppositely varying; and
invoke conflict logic that sets the inlet temperature modifier value to zero when the two or more of the sensed gas turbine engine parameters oppositely vary.

13. The system of claim 8, wherein:
the engine data source comprises an engine inlet total temperature sensor that supplies the sensed engine inlet total temperature; and
the engine control unit is further configured to:
  process the sensed engine inlet total temperature through a limiting and filtering algorithm to supply a filtered and limited total temperature,
  filter the sensed engine inlet total temperature through a lead filter to supply an estimated true temperature, and
  compare the filtered and limited total temperature to the estimated true temperature to determine the inlet temperature modifier value.

14. The system of claim 13, wherein the engine control unit is further configured to determine or use the inlet temperature modifier value only when the estimated true temperature exceeds the filtered and limited total temperature by a predetermined magnitude.

15. A system, comprising:
a gas turbine engine including a compressor section and a plurality of compressor inlet guide vanes, the plurality of compressor inlet guide vanes respond to guide vane commands to move to commanded guide vane positions;
an engine data source in operable communication with the gas turbine engine and configured to supply an engine data representative of one or more sensed gas turbine engine parameters; and
an engine control unit in operable communication with the gas turbine engine and the engine data source and configured to implement a compressor inlet guide vane control algorithm, the engine control unit coupled to receive the engine data from the engine data source and an inlet temperature value that is at least representative of a sensed engine inlet total temperature, the engine control unit configured to:
  (i) supply the inlet temperature value to the compressor inlet guide vane control algorithm,
  (ii) process the one or more sensed gas turbine engine parameters to determine an inlet temperature modifier value, the inlet temperature modifier value being an estimate of a difference between the sensed engine inlet total temperature and an actual engine inlet total temperature,
  (iii) add the inlet temperature modifier value to the inlet temperature value to derive a modified engine inlet total temperature,
  (iv) use the modified engine inlet total temperature in the compressor inlet guide vane control algorithm, and
  (v) control the compressor inlet guide vanes using the compressor inlet guide vane control algorithm.

16. The system of claim 15, wherein the engine data source comprises a plurality of sensors, the plurality of sensors includes one or more of:
a compressor discharge pressure sensor;
a fuel flow sensor;
a turbine temperature sensor; and
a shaft torque sensor.

17. The system of claim 16, wherein the engine control unit is further configured to:
compare one or more of a sensed compressor discharge pressure, a sensed fuel flow, a sensed turbine temperature, and a sensed shaft torque to an expected value of compressor discharge pressure, an expected value of fuel flow, an expected value of turbine temperature, and an expected value of shaft torque respectively; and
determine or use the inlet temperature modifier value only when one or more of:
  (i) the sensed compressor discharge pressure differs from the expected value of compressor discharge pressure by a first predetermined magnitude,
  (ii) the sensed fuel flow differs from the expected value of fuel flow by a second predetermined magnitude,
  (iii) the sensed turbine temperature differs from the expected value of turbine temperature by a third predetermined magnitude, and
  (iv) the sensed shaft torque differs from the expected value of shaft torque by a fourth predetermined magnitude.

18. The system of claim 15, wherein the engine control unit is further configured to:
determine if two or more of the sensed gas turbine engine parameters are oppositely varying; and
invoke conflict logic that sets the inlet temperature modifier value to zero when the two or more of the sensed gas turbine engine parameters oppositely vary.

19. The system of claim 15, wherein:
the engine data source comprises an engine inlet total temperature sensor that supplies the sensed engine inlet total temperature; and
the engine control unit is further configured to:
  process the sensed engine inlet total temperature through a limiting and filtering algorithm to supply a filtered and limited total temperature,
  filter the sensed engine inlet total temperature through a lead filter to supply an estimated true temperature, and
  compare the filtered and limited total temperature to the estimated true temperature to determine the inlet temperature modifier value.

20. The system of claim 19, wherein the engine control unit is further configured to determine or use the inlet temperature modifier value only when the estimated true temperature exceeds the filtered and limited total temperature by a predetermined magnitude.

* * * * *